United States Patent [19]
Andre et al.

[11] Patent Number: 5,234,371
[45] Date of Patent: Aug. 10, 1993

[54] LOIN PULLER

[75] Inventors: L. George Andre, Hamilton, Ohio; Lawrence D. Boody, Roane, Tenn.; David R. Chappell, Loudon, Tenn.; Joseph C. Gundlach, Anderson, Tenn.

[73] Assignee: Acraloc Corporation, Oak Ridge, Tenn.

[21] Appl. No.: 873,378

[22] Filed: Apr. 24, 1992

[51] Int. Cl.⁵ ............................................. A22C 17/04
[52] U.S. Cl. ..................................... 452/171; 452/135
[58] Field of Search ................................. 452/171, 135

[56] References Cited

U.S. PATENT DOCUMENTS

| | | | |
|---|---|---|---|
| 3,352,011 | 11/1967 | Alexander et al. | 452/171 |
| 3,546,737 | 12/1970 | Neebel et al. | 452/171 |
| 3,771,196 | 11/1973 | Doerfer et al. | 452/171 |
| 4,979,269 | 12/1990 | Norrie | 452/171 |

Primary Examiner—Willis Little
Attorney, Agent, or Firm—Pitts & Brittian

[57] ABSTRACT

An improved loin puller (10) for trimming the back fat (34) from a loin (32) which is attached to a carcass half (30) by using an automated system having a variable width and depth of cut. A frame (12) is provided to support the individual components of the improved loin puller (10) a selected distance above a support surface (38). A conveyor belt (50) is provided for conveying the carcass half (30) toward a cutting blade (76). Loin engagement chains (56) are provided for pulling the loin (32) and associated back fat (34) toward and across the cutting blade (76). The cutting blade (76) is provided for separating the loin (32) from the back fat (34). A cutting depth adjuster (20) is provided for selectively controlling the depth of cut. A cutting width adjustor (22) is provided for selectively varying the width of the cut without substantially varying the depth of the cut. A cutting blade heater (28) is provided for heating the cutting blade (76) to soften the fat being cut and thus ease the cutting pressure required. A second conveyor belt (118) may be provided for supporting and conveying the front portion of the carcass half (36). A stationary support shelf (154) may alternatively be provided for supporting the front portion of the Carcass half (154).

19 Claims, 6 Drawing Sheets

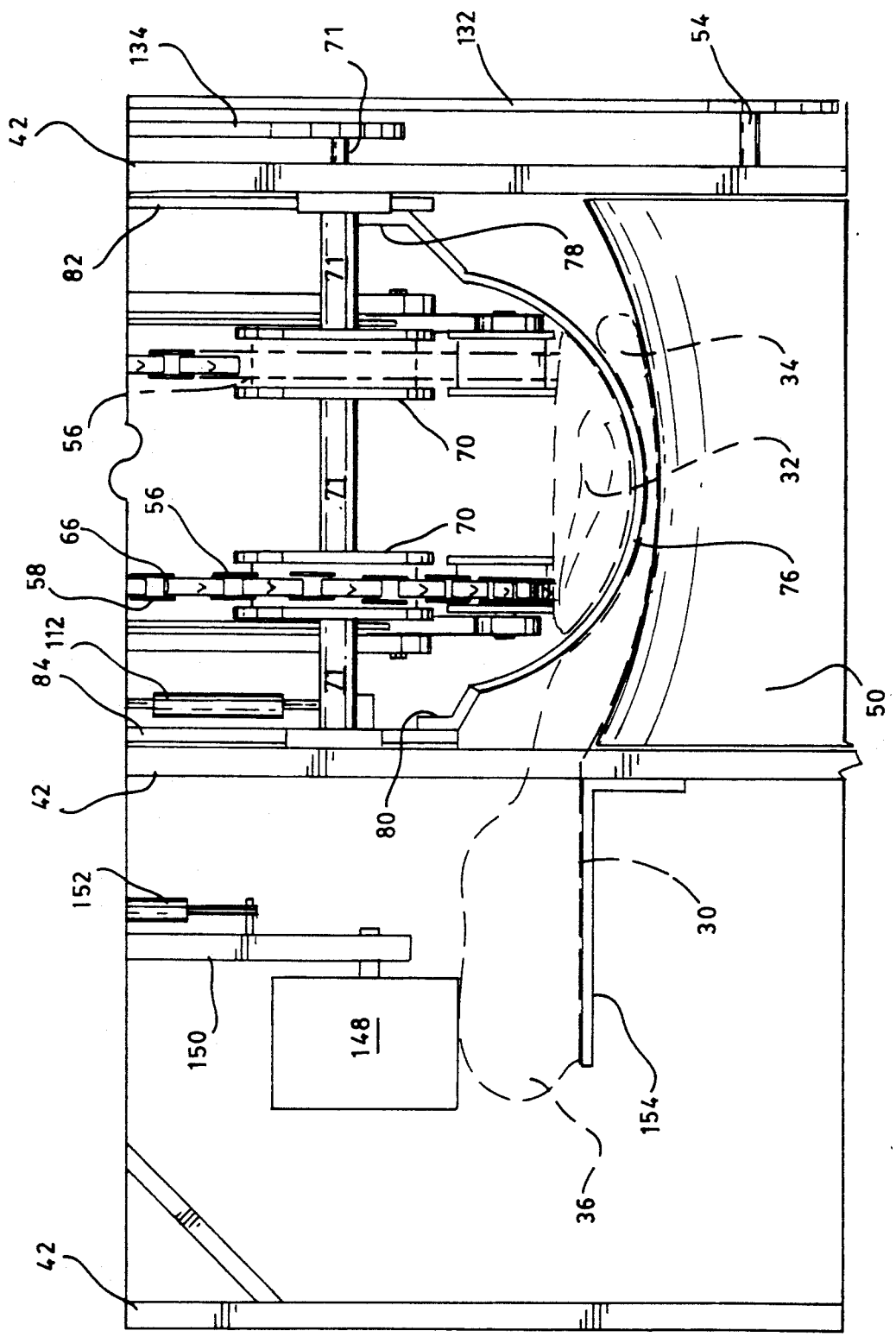

2

LOIN PULLER

TECHNICAL FIELD

This invention relates to the field of food processing. More specifically, this invention relates to the field of trimming the fat from the back of loins. The particular invention herein described is designed specifically for removing the back fat from pork loins, but may conceivably be used in similar operation with other types of meat as well.

BACKGROUND ART

In the field of food processing, it is well known that excess fat is removed from the back of the loin of an animal before cutting and or packing the meat for marketing. Typically, the carcass of an animal is cut into two halves, the left side and right side of the animal. Each carcass half includes a loin to be removed from the back fat. The loin is adjacent to the back bone and is situated between the ribs and the outer layer of fat, which is to be removed.

Typically, the loins are removed from the carcass halves by using hand-manipulated knives pulled from one end of the carcass to the other. The knives are contoured to match the curvature of the loins. Such manipulation has been known to cause physical problems from the repetition of this process many times an hour.

Several automatic devices have been developed to provide the same or similar functions of the hand-manipulated knives in a more time-efficient and less physically detrimental manner. Typical of the art is the device disclosed in U.S. Pat. No. 4,189,806 issued to W. P. Van Heyningen on Feb. 26, 1980 and Canadian Patent No. 1,079,114 issued on Jun. 10, 1980. Each of these patents disclose the same invention. Reference will be made to the U.S. Patent, and may be referred to as "the '806 patent".

The devices that have been developed and which are known have not yet enabled the loin to be removed from the back fat without requiring the further splitting of the carcass halves into quarters. The device disclosed in the '806 patent requires that the loin portions be first separated from the carcass halves or sides by cutting straight through the scribed ribs and tissues. It is desirable, however, to remove the loin from the carcass halves without necessitating the quartering of the carcass.

The cutting blade used in the β806 device has a fixed symmetrical shape such that both loins may be removed with the same device. However, the desired cut does not define a constant geometric configuration over the length of the loin. The desired width of the cut is greater at one end of the loin than at the other.

It is well known in the field of butchering that when separating the fat from the loin, a more efficient cut is made when the cutting blade is heated. Hand-manipulated blades are typically dipped in hot water to aid in heating the blade. Automatic devices have not yet been provided with a means for heating the cutting blade.

Therefore, it is an object of this invention to provide a means for trimming the back fat from loin in the food processing industry.

Another object of the present invention is to provide a means whereby the loin may be removed from a carcass half without requiring the quartering of the carcass.

It is also an object of the present invention to provide a means whereby the width of the cut may be selectively varied over the length of the cut along the carcass.

Still another object of the present invention is to provide a means whereby the cutting blade may be heated to ease the removal of excess back fat from the loin.

DISCLOSURE OF THE INVENTION

Other objects and advantages will be accomplished by the present invention which serves to trim the back fat from a loin. More specifically, the present invention serves to separate back fat from a pork loin which is attached to a carcass half by using an automated system having a variable width and depth of cut. Moreover, in the preferred embodiment the improved loin puller is designed to heat the cutting means in order to ease the cut between the loin and the back fat.

The improved loin puller is supported by a frame means which is configured to engage a support surface and elevate the working surface to a comfortable level for the operator. A conveyor means is provided for conveying the carcass half toward a cutting means. The conveyor means of the preferred embodiment includes at least a conveyor belt controlled by a motor and moved in an endless-loop fashion and restrained by at least a pair of conveyor belt engagement wheels. The conveyor belt engagement wheels of the preferred embodiment are rotated by the motor. The conveyor means motor of the preferred embodiment is electrically operated and may be provided with means for varying the speed of the conveyor belt. In an embodiment where a motor is selected with means for varying the speed, the operator of the improved loin puller may selectively alter the speed at which the loin and back fat are separated by altering the electricity supplied to the conveyor means motor.

A loin engagement means is provided for pulling the loin and associated back fat toward and across a cutting means. The loin engagement means includes a plurality of chain members vertically disposed above the conveyor means. The chain members are positioned a distance above the conveyor belt such that the carcass half is engaged by the chain members and pressed toward the conveyor belt when the carcass half is passed between the chain members and the conveyor belt. Each chain member is comprised of a plurality of links pivotally connected at one end to an adjacent link by means of a pivoting member. Each link defines at least one extended portion, or tooth, extending away from the chain member and toward the conveyor means when positioned at the lower portion of the loop configuration. Thus, when the carcass half is passed between the chain members and the conveyor belt, the teeth will engage the top portion of the loin and pull the meat toward and across the cutting means.

A motor is provided for driving the chain members about the endless-loop configuration. The velocity of the chain members is substantially equal to that of the conveyor belt such that the carcass half being pulled is not made to move in relation to the conveyor belt or the chain members. In order to accomplish the variability in speed while maintaining the equality in speed between the conveyor belt and the chain members, the loin engagement means and the conveyor means are preferably powered by the same motor.

A plurality of idler wheels is provided for biasing the bottom portion of the loop defined by the chain members downward, thereby enhancing the engagement between the chain members and the loin. Each idler wheel is biased in a downward direction. In the preferred embodiment, an idler wheel is positioned above the cutting means to insure that the carcass is not permitted to shift with respect to the cutting means thereby altering at least the depth of cut. Each idler wheel may be selectively raised and lowered to conform to the upper contour defined by the loin being pulled.

A cutting means is provided for separating the loin from the back fat. The cutting means includes a cutting blade configured to closely match the desired contour to be cut. The cutting blade is fixed at one end in relation to a position along the width of the conveyor means to insure a straight cut along the portion of the carcass adjacent the chime bone. A second end is fixed to a cutting width adjustment means. At least a portion of the cutting width adjustment means and the first end of the cutting blade are affixed to and carried by a cutting depth adjustment means. The cutting depth adjustment means is carried by the frame means.

The cutting depth adjustment means is provided for selectively controlling the depth of cut. The cutting depth adjustment means includes at least a pair of oppositely disposed vertically sliding members. The sliding members are received through guides which are carried by the frame means, the guides serving to limit the movement of the cutting depth adjustment means to movement in a substantially vertical direction. The sliding members are connected at first ends by a connecting member. The first end of the cutting blade is fixed to the first sliding member. A cutting width adjustment means is fixed to the second sliding member, the second end of the cutting blade being affixed to the cutting width adjustment means. A piston rod is connected between the connecting member and the frame. A pump is electrically operated to inject and evacuate hydraulic fluid to and from the hydraulic cylinder to alter the elevation of the distal end of the piston rod. Activation of the pump will result in the selective raising or lowering of the piston rod, thereby raising or lowering the sliding members, and finally raising or lowering the cutting blade. The width of the cutting blade is substantially unchanged as it is selectively raised and lowered. A toggle-type switch is provided in electrical communication with a selected power source and the pump.

A cutting width adjusting means is carried by the cutting depth adjusting means for selectively varying the width of the cut without substantially varying the depth of the cut. One end of the cutting blade is affixed to the blade mount such that as the blade mount is moved, the end of the cutting blade is moved in a similar fashion. With the inward movement of the cutting blade end, the width of the defined contour will be narrowed. However, with the simultaneous upward movement of the cutting blade end, the lowest portion of the cutting blade will remain at a substantially constant spacing from the conveyor belt, thus insuring a substantially constant depth of cut.

The cutting width adjustment means of the preferred embodiment is electro-hydraulically operated. A toggle-type switch is provided for operator control of the cutting width during the cutting process. In order to facilitate the ease of operation of the improved loin puller, a remote operating box may be provided such that an operator may control at least the basic functions. The toggle switches provided to control the cutting depth and cutting width adjustment means, respectively, may be carried by the remote operating box. A power switch may also be provided to selectively activate and de-activate the improved loin puller motor.

A cutting blade heating means is provided for heating the cutting blade to soften the fat being cut and thus ease the cutting pressure required. To accomplish this, inlet and outlet headers may be provided for fluid communication between a steam or heated fluid source and at least one channel defined by the cutting blade. After the steam or heated fluid is evacuated, it may be discarded or recirculated through a heating source and toward the inlet header. Alternatively, the cutting blade may heated using resistive heat from an electric circuit.

In order to facilitate the processing of a carcass half without necessitating the quartering of the carcass, a secondary conveyor means may be provided for supporting and conveying the front portion of the carcass half. The secondary conveyor means includes at least a conveyor belt defining an endless-loop configuration. The conveyor belt is moved simultaneously with the conveyor means provided for conveying the carcass half toward the cutting means. In the preferred embodiment, both conveyor belts are powered by the conveyor means motor.

For smaller or less restrictive animals, the conveyance of the front quarter of the carcass half may not be required. Therefore, a stationary support member may be carried by the frame, in lieu of a secondary conveyor means, for supporting the front quarter of the carcass while the carcass half is being pulled.

BRIEF DESCRIPTION OF THE DRAWINGS

The above mentioned features of the invention will become more clearly understood from the following detailed description of the invention read together with the drawings in which:

FIG. 3B is an end view of an alternate embodiment of the improved loin puller shown in FIG. 1;

BEST MODE FOR CARRYING OUT THE INVENTION

Figure 1:
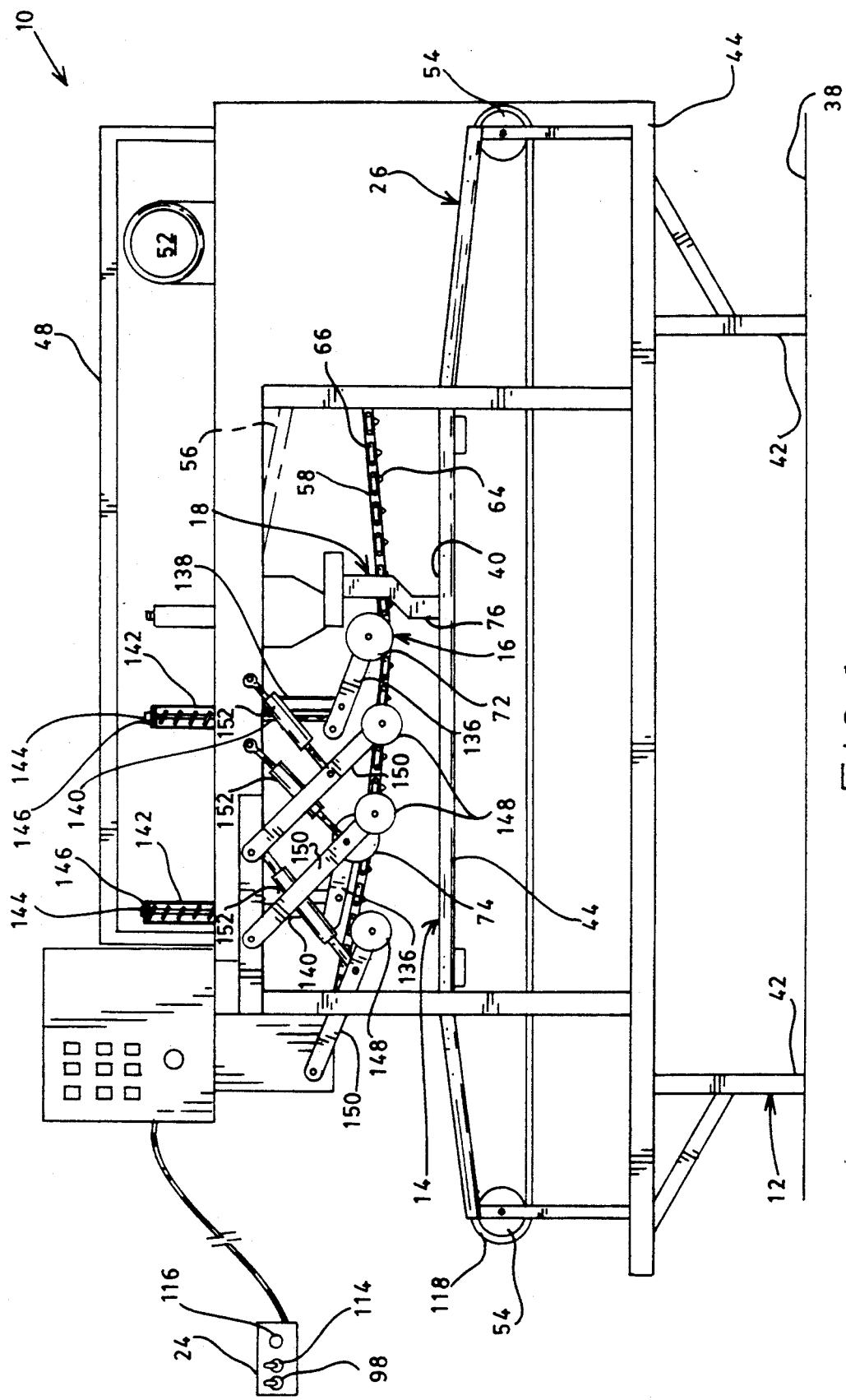
FIG. 1 is a side elevation view of the improved loin puller constructed in accordance with several features of the present invention.
Figure 2:
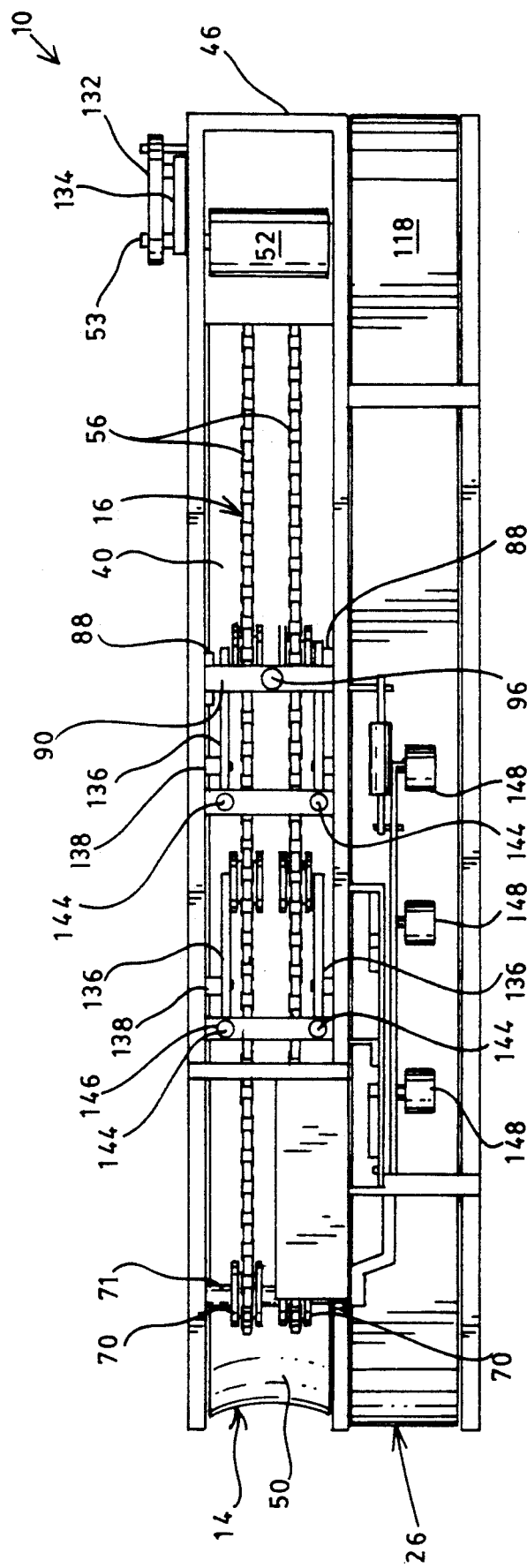
FIG. 2 illustrates a top plan view of the improved loin puller shown in FIG. 1.

An improved loin puller incorporating various features of the present invention is illustrated generally at 10 in the figures. The improved loin puller 10 is designed for separating back fat 34 from a pork loin 32 which is attached to a carcass half 30 by using an automated system having a variable width and depth of cut. Moreover, in the preferred embodiment the improved loin puller 10 is designed to heat the cutting blade 76 in order to ease the cut between the loin 32 and the back fat 34.

The improved loin puller 10 is supported by a frame means 12 which is configured to engage a support surface 38 and elevate the working surface 40 to a comfortable level for the operator. The frame means 12 includes a plurality of vertically disposed leg members 42, a plurality of horizontally disposed brace members 44 positioned longitudinally with respect to the improved loin puller 10, and a plurality of horizontally disposed brace members 46 positioned at substantial right angles to the longitudinal axis of the improved loin puller 10. It will be understood that the configuration depicted in the figures and described herein is so depicted and described for simplicity, and is not intended to limit the frame means 12 to such configuration. Other configurations may be as easily implemented with similar results.

A conveyor means 14 is provided for conveying the carcass half 30 toward a cutting means 18. As shown in the figures, the conveyor means 14 of the preferred embodiment includes at least a conveyor belt 50 controlled by a motor 52 and moved in an endless-loop fashion and restrained by at least two conveyor belt engagement wheels 54. The conveyor belt engagement wheels 54 of the preferred embodiment are pivotally connected to the frame means 12 in a conventional fashion and rotated about their longitudinal axes by the motor 52. To this end, a conveyor means engagement chain 132 is engaged by a distal end of the motor shaft 53 and a distal end of at least one conveyor belt engagement wheel 54. The conveyor belt 50 may be of any conventional type. As shown in the figures, the conveyor belt 50 of the preferred embodiment is fabricated from a pliable material such as rubber in order to withstand the continuous deformation of the conveyor belt 50 at either end of the improved loin puller 10.

The motor 52 of the preferred embodiment is electrically operated and may be provided with means for varying the speed of the conveyor belt 50. In an embodiment where a motor 52 is selected with means for varying the speed, the operator of the improved loin puller 10 may selectively alter the speed at which the loin 32 and back fat 34 are separated by altering the electricity supplied to the motor 52. The motor 52 may be any suitable motor readily available and commonly known in the art.

A loin engagement means 16 is provided for pulling the loin 32 and associated back fat 34 toward and across a cutting means 18. The loin engagement means 16 of the preferred embodiment includes a plurality of chain members 56 vertically disposed above the conveyor means 14, each chain member 56 defining an endless loop configuration. The chain members 56 are positioned a distance above the conveyor belt 50 such that the carcass half 30 is engaged by the chain members 56 when the carcass half 30 is passed between the chain members 56 and the conveyor belt 50. As shown in the figures, two chain members 56 are provided in the preferred embodiment. It is envisioned that one or more chain members 56 may be sufficient for other embodiments.

Each chain member 56 of the preferred embodiment is comprised of a plurality of links 58 pivotally connected at each end to respective adjacent links by means of a pivoting members 66. Each link 58 defines at least one extended portion, or tooth 64, extending away from the chain member 56 and toward the conveyor means 14 when positioned at the lower portion of the loop configuration. Thus, when the carcass half 30 is passed between the chain members 56 and the conveyor belt 50, the teeth 64 will engage the top portion of the loin 32 and pull the meat toward and across the cutting means 18.

The motor 52 serves to drive the chain members 56 about the loop configuration, much like the manner in which a bicycle chain is driven. The motor 52 drives one of at least two sprocket members 70 provided for maintaining the loop configuration defined by the chain members 56. Similarly to the driving of the conveyor belt 50, an engagement chain 134 is provided for being engaged by an axle member 71 of the sprocket member 70 and the motor shaft 53. The sprocket members 70 are pivotally attached to an upper frame 48 carried by the frame 12. In the preferred embodiment, the linear velocity of the chain members 56 is substantially equal to that of the conveyor belt such that the carcass half 30 being pulled is not made to move in relation to the conveyor belt 50 or the chain members 56.

A plurality of idler wheels 72,74 is provided for biasing the bottom portion of the loop defined by the chain members 56 downward, thereby enhancing the engagement between the chain members 56 and the loin 32. The idler wheels 72,74 may be biased downwardly in any conventional method. In the preferred embodiment, the idler wheel 72 is positioned above the cutting means 18 to insure that the carcass half 30 is not permitted to shift with respect to the cutting means 18 thereby altering at least the depth of cut.

Each idler wheel 72,74 may be independently and selectively raised and lowered to closely engage the loin 32. For a loin 32 which is varied in thickness from one side to the other, the portion adjacent the backbone typically being thinnest, the chain members 56 may be raised and lowered by raising and lowering the associated idler wheels 72,74. The selective raising and lowering of the idler wheels 72,74 of the preferred embodiment is accomplished by the incorporation of a pivoting arm 136 connected at one end to the idler wheel 72,74 and pivotally connected proximate a central portion to a support member 138 fixed to the frame 12. An adjusting rod 140 is connected at a distal end of the pivoting arm 136 and is received through an opening (not shown) in the frame 12 and through the central portion of a compression-type spring member 142. The distal end of the adjusting rod 140 is threaded to cooperate with a nut member 144. A washer member 146 is placed over one end of the compression-type spring member 142, the adjusting rod 140 distal end being received through the washer member 146 opening. The nut member 144 is then engaged by the adjusting rod 140 threaded portion and tightened to a selected position. As the nut member 144 is tightened, the idler wheel 72,74 will reactively be adjusted downward, and vice versa.

A cutting means 18 is provided for separating the loin 32 from the back fat 34. The cutting means 18 includes at least a cutting blade 76 configured to closely match the desired contour of the cut. As shown, the cutting blade 76 of the preferred embodiment defines an asymmetrical arcuate configuration to closely conform to the contour of the loin 32. The cutting blade 76 of the preferred embodiment is fixed at one end 78 in relation to a position along the width of the conveyor means 14 to insure a straight cut along the portion of the carcass adjacent the chime bone. A second end 80 is fixed to a cutting width adjustment means 22. At least a portion of the cutting width adjustment means 22 and the first end 78 of the cutting blade 76 are affixed to and carried by a cutting depth adjustment means 20. The cutting depth adjustment means 20 is carried by the frame means 12.

It will be understood that due to the asymmetrical configuration of the cutting blade 76, it may be desirable to construct opposite-hand improved loin pullers 10 to most efficiently pull loins 32 which are from opposing sides of the animal.

The cutting depth adjustment means 20 is provided for selectively controlling the depth of cut. For carcasses with less back fat 34, the depth of cut required will be lower than for carcasses with greater amounts of back fat 34. The cutting depth adjustment means 20 of the preferred embodiment includes at least a pair of oppositely disposed vertically sliding members 82,84. The sliding members 82,84 are received through guides 88 which are carried by the frame means 12, the guides 88 serving to limit the movement of the cutting depth adjustment means 20 to movement in a substantially vertical direction. The sliding members 82,84 are connected at first ends 86 by a connecting member 90. As shown, the connecting member 90 is attached proximate the upper ends of the sliding members 82,84. However, it is conceivable that the connecting member 90 may be connected proximate the bottom ends of the sliding members 82,84.

The first end 78 of the cutting blade 76 is fixed to the first sliding member 82 using any conventional method such as welding. A cutting width adjustment means 22 is fixed to the second sliding member 84 using any conventional method such as welding, the second end 80 of the cutting blade 76 being affixed to the cutting width adjustment means 22.

A piston rod 92 is attached proximate a distal end 94 to the connecting member 90. The piston rod 92 illustrated in the figures is incorporated in a hydraulic cylinder 96, but it will be understood that any conventional method of elevating and lowering the piston rod 92 may be used. A pump (not shown) is electrically operated to inject and evacuate hydraulic fluid to and from the hydraulic cylinder 96 to alter the elevation of the distal end 94 of the piston rod 92. Therefore, by activating the pump, the piston rod 92 will be selectively raised or lowered, thereby raising or lowering the sliding members 82,84, and finally raising or lowering the cutting blade 76. The contour of the cut is substantially unchanged as the cutting blade 76 is selectively raised and lowered.

The cutting depth adjustment means 20 of the preferred embodiment is provided with a two position ON/one position OFF toggle-type switch 98 in electrical communication with a selected power source and the pump. The central position is OFF. When the toggle switch 98 is operated in one direction, the cutting depth will decrease. Likewise, when the toggle switch 98 is operated in an opposing direction, the cutting width will increase.

A cutting width adjusting means 22 is carried by the cutting depth adjusting means 20 for selectively varying the width of the cut without substantially varying the depth of the cut. The cutting width adjusting means 22 includes at least two pivoting members 100 pivotally connected at first ends 102 to the cutting depth adjustment means 20 and at second ends 104 to a blade mount 106. The blade mount 106 is pivotally connected to a distal end 110 of a piston rod member 108, the piston rod 108 being incorporated in a hydraulic cylinder 112.

The first end 113 of the hydraulic cylinder 112 is pivotally connected proximate the first end 86 of the cutting depth adjustment means second sliding member 84. As the piston rod 108 is retracted, the blade mount 106 is pulled upwardly and inwardly. An actuating line 115 is provided for activating the hydraulic cylinder 112.

The second end 80 of the cutting blade 76 is affixed to the blade mount 106 such that as the blade mount 106 is moved upwardly and inwardly, the second end 80 of the cutting blade 76 is moved in a similar fashion. With the described inward movement of the cutting blade second end 80, the width of the defined contour will be narrowed. However, with the described upward movement of the cutting blade second end 80, the lowest portion of the cutting blade 76 will remain at a substantially constant spacing from the conveyor belt 50, thus insuring a substantially constant depth of cut.

The cutting width adjustment means 22 of the preferred embodiment is electro-hydraulically operated. It may be desirable to operate the cutting width adjustment means 22 during the cutting process of a single carcass, specifically due to the configuration of the loin to be cut. Therefore, a switching means 114 is provided for operator control of the cutting width during the cutting process. In the preferred embodiment, a two-position ON/one position OFF toggle-type switch 114 is provided. The central position is OFF. When the toggle switch 114 is operated in one direction, the cutting width will broaden. Likewise, when the toggle switch 114 is operated in an opposing direction, the cutting width will narrow.

In order to facilitate the ease of operation of the improved loin puller 10, a remote operating box 24 may be provided such that an operator may control at least the basic functions. The toggle switches 98,114 provided to control the cutting depth and cutting width adjustment means 20,22, respectively, may be carried by the remote operating box 24. A power switch 116 may also be provided to selectively activate and de-activate the improved loin puller 10.

In order to facilitate the processing of a carcass half 30 without necessitating the quartering of the carcass, a secondary conveyor means 26 may be provided for supporting and conveying the front portion 36 of the carcass half 30. The secondary conveyor means 26 includes at least a conveyor belt 118 of a selected fabrication and defining an endless-loop configuration. The conveyor belt 118 is preferably moved simultaneously with the conveyor means 14 provided for conveying the carcass half 30 toward the cutting means 18. In the preferred embodiment, both conveyor means 14,26 are powered by the motor 52. To this end, the conveyor belt engagement wheels 54 as described above may be configured to engage the conveyor belt 118.

Figure 3A:
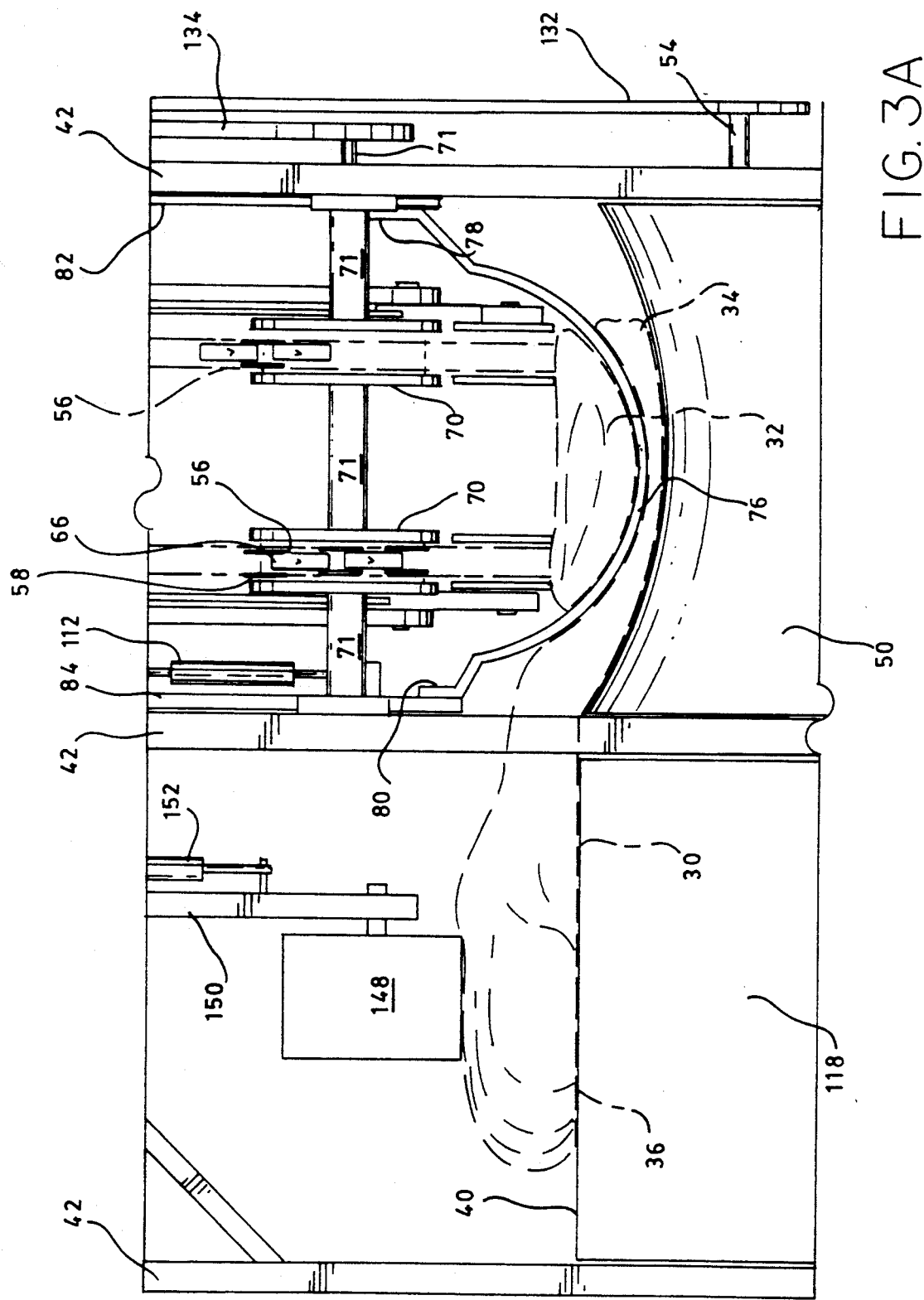
FIG. 3A is an end view of a preferred embodiment of the improved loin puller shown in FIG. 1.
Figure 4:
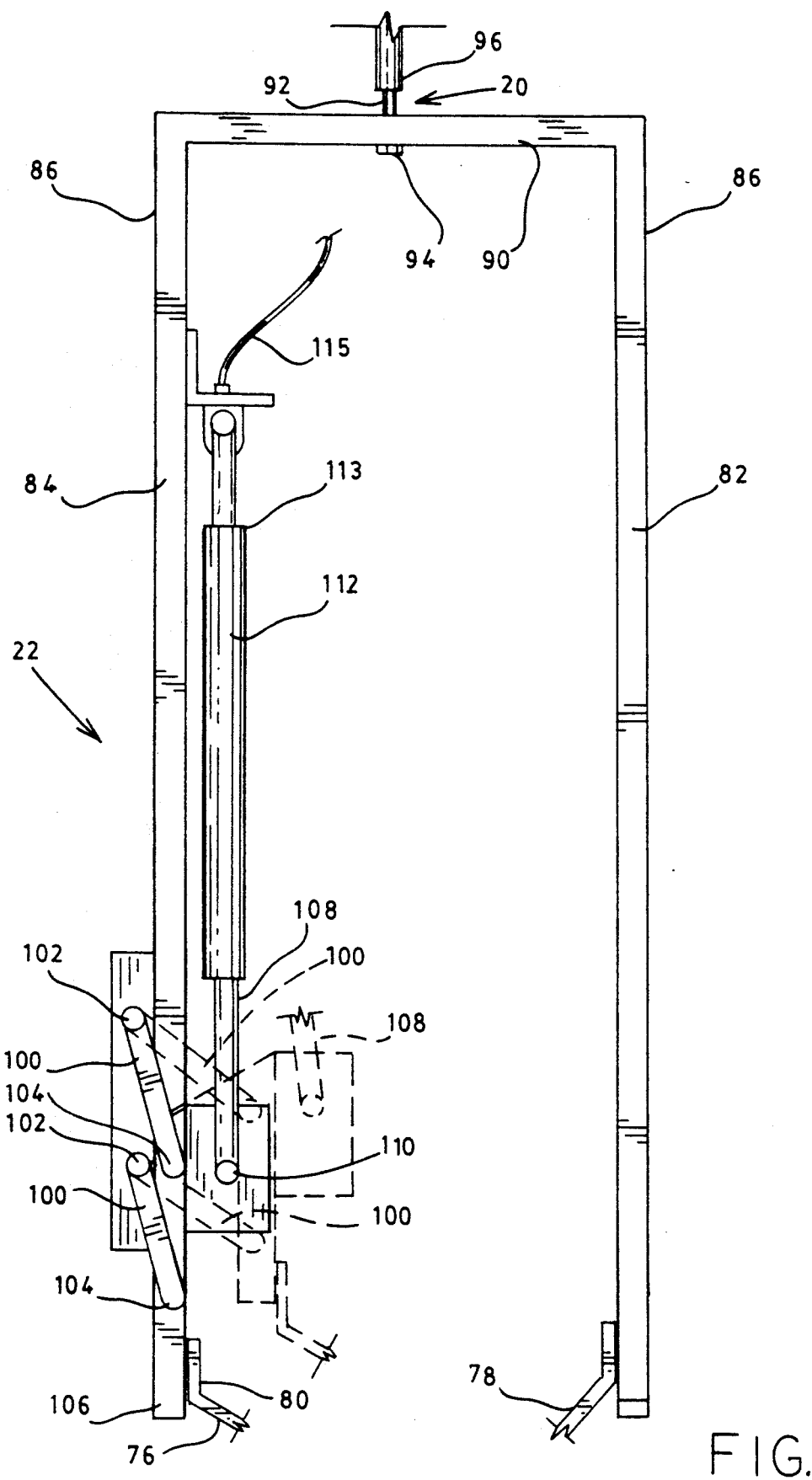
FIG. 4 illustrates a side elevation view of the cutting width adjustment means of the present invention.
Figure 5:
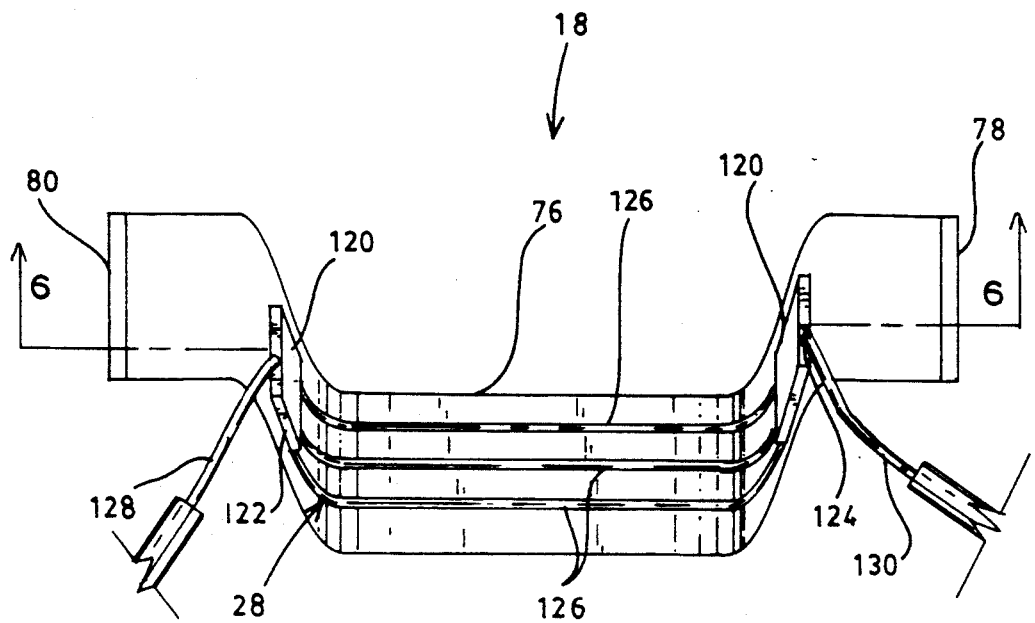
FIG. 5 illustrates a top plan view of one embodiment of the cutting means of the present invention.
Figure 6:
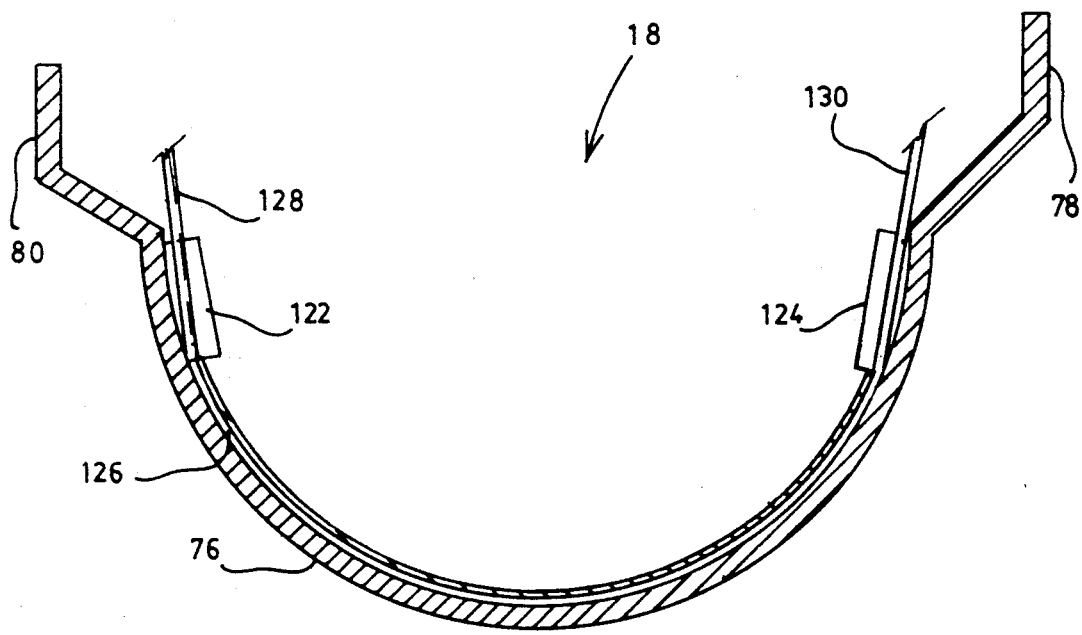
FIG. 6 is a side elevation view, in section, of the cutting means shown in FIG. 5 taken along 6—6.

For smaller or less restrictive animals, the conveyance of the front portion 36 of the carcass half may not be required. Therefore, a stationary support member 154 may be carried by the frame 12, in lieu of a secondary conveyor means 26, for supporting the front portion 36 of the carcass half 30 while the carcass half 30 is being pulled. The stationary support member 154 may define a shelf member, as depicted in FIG. 3B, conventionally fastened to the frame 12 proximate the conveyor means 14. The stationary support member 154 defines a selected length and extends at a selected angle, with respect to the horizontal, away from the frame 12. The front portion 36 of the carcass half 30 may be supported by the stationary support member 154 and may slide along the top surface thereof as the carcass half 30 is being pulled.

A plurality of restraining wheels 148 may be provided for preventing the front portion of the carcass half 30 from unselected movement in the vertical direction. Each restraining wheel is pivotally connected to a first end of a pivoting arm 150. The distal end of each pivoting arm 150 is pivotally connected to the upper frame 48. A biasing means 152 is connected between each pivoting arm 150 and the upper frame 48 in order to insure a bias toward the conveyor means 26, thus urging the carcass half 30 toward the conveyor means 26. In the preferred embodiment, the biasing means 152 is a pneumatic-type shock absorber.

A cutting blade heating means 28 is provided for heating the cutting blade 76 to soften the fat being cut and thus ease the cutting pressure required. Headers 120 may be provided for fluid communication between a steam or heated fluid source and at least one channel 126 defined by the cutting blade 76. An inlet header 122 is provided to allow the entry of steam or heated fluid into and through the channels 126 from inlet line 128. An outlet header 124 is provided to allow the evacuation of the steam or heated fluid into outlet line 130 after passing through the channels 126. After the steam or heated fluid is evacuated, it may be discarded or recirculated through a heating source (not shown) and toward the inlet header 122.

Although not shown, the function of the cutting blade heating means 28 of an alternate embodiment is accomplished through the use of resistive heat. To this end, a power source may be connected to the cutting blade 76 such that the cutting blade 76 is heated through the passage of electricity.

From the foregoing description, it will be recognized by those skilled in the art that an improved loin puller offering advantages over the prior art has been provided. Specifically, the improved loin puller provides a means for pulling a carcass half toward a cutting blade, the cutting blade serving to cut the loin from the carcass half. The width and depth of cut may be independently and selectively varied. The cutting blade is provided with means for heating same in order to ease the cut between the loin and the back fat.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. An improved loin puller for pulling a selected carcass half and separating the loin thereof from the back fat, said improved loin puller comprising:
    a frame for elevating a working surface a selected distance above a support surface;
    a conveyor carried by said frame by conveying said carcass half toward a selected location;
    a cutting blade carried by said frame proximate said selected location, said cutting blade being disposed a selected distance above said conveyor to define a depth of cut, said cutting blade defining a selected cutting contour for separating said loin from said back fat;
    a cutting blade elevation adjustor for obtaining said selected distance of said cutting blade above said conveyor;
    a cutting width adjustor carried by said cutting blade elevation adjustor, and independently operable by an operator of said loin puller, for selectively narrowing and widening said cutting contour of said cutting blade during said separating of said loin from said back fat; and
    a loin gripper carried by said frame for gripping said loin and forcing said loin and said back fat in a direction toward said conveyor.

2. The improved loin puller of claim 1 wherein said cutting width adjustor is pivotally mounted from said cutting blade elevation adjustor with a pair of pivoting parallel arms and thereby serves to selectively narrow and widen said cutting contour while substantially unaltering said depth of cut during operation of said cutting width adjustor for said selectively narrowing and widening of said cutting blade contour, and said pivotal mounting thereby serves to allow selective operation of said cutting blade elevation selector while substantially unaltering said cutting contour of said cutting blade.

3. The improved loin puller of claim 2 wherein one end of said cutting blade is attached to said cutting blade elevation adjustor and wherein said cutting width adjustor comprises:
    a blade mount for receiving a second end of said cutting blade;
    said parallel arms having one end of each pivotally attached to said blade mount and second ends of each pivotally attached to said cutting blade elevation adjustor;
    a piston rod attached to said blade mount;
    a fluid-operated cylinder for producing axial movement of said piston rod;
    a pump for injecting and evacuating fluid relative to said cylinder; and
    a switch for controlling said pump to achieve said injecting and evacuating of fluid relative to said cylinder.

4. The improved loin puller of claim 1 wherein said loin gripper includes a plurality of chain members and at least two sprocket members carried by said frame, each of said plurality of chain members being comprised of a plurality of link members defining an endless loop configuration, said link members defining extended portions for engaging said loin, said sprocket members being positioned to maintain each of said plurality of chain members in said endless loop, said sprocket members being rotated by a motor, thereby engaging each of said plurality of chain members in travel along said endless loop.

5. The improved loin puller of claim 4 wherein said loin gripper further includes biasing members for biasing each of said plurality of chain members in a direction toward said conveyor, said biasing members being carried by said frame and including at least one idler wheel disposed within said loop defined by each of said plurality of chain members, said idler wheel being biased in a direction toward said conveyor.

6. The improved loin puller of claim 1 further comprising a secondary conveyor carried by said frame for supporting and conveying a front quarter portion of said carcass half.

7. The improved loin puller of claim 1 further comprising a stationary support member carried by said frame for supporting a front quarter portion of said carcass half.

8. The improved loin puller of claim 1 further comprising a cutting blade heater carried by said cutting blade for heating said cutting blade during operation of said improved loin puller.

9. An improved loin puller for pulling a selected carcass half and separating the loin thereof from the back fat, said improved loin puller comprising:
- a frame for elevating a working surface a selected distance above a support surface;
- a conveyor carried by said frame for conveying said carcass half toward a selected location;
- a cutting blade carried by said frame proximate said selected location, said cutting blade being disposed a selected distance above said conveyor means to define a depth of cut, said cutting blade defining a selected cutting contour for separating said loin from said back fat;
- a cutting blade heater carried by said cutting blade for heating said cutting blade during operation of said improved loin puller;
- a cutting depth adjustor carried by said frame for selectively increasing and decreasing said depth of cut;
- a cutting width adjustor carried by said cutting depth adjustor, and independently operable by an operator of said loin puller, for selectively narrowing and widening said cutting contour during said separating of said loin from said fat back, said cutting width adjustor substantially unaltering said depth of cut during operation of said cutting width adjustor; and
- loin gripping means carried by said frame for gripping said loin and forcing said loin and said back fat in a direction toward said conveyor.

10. The improved loin puller of claim 9 wherein said loin gripper includes a plurality of chain members and at least two sprocket members carried by said frame, each of said plurality of chain members being comprised of a plurality of link members defining an endless loop configuration, said link members defining extended portions for engaging said loin, said sprocket members being positioned to maintain each of said plurality of chain members in said endless loop, said sprocket members being rotated by a motor, thereby engaging each of said plurality of chain members in travel along said endless loop.

11. The improved loin puller of claim 10 said loin gripper further includes biasing members carried by said frame for biasing each of said plurality of chain members in a direction toward said conveyor, said biasing members including at least one idler wheel disposed within said loop defined by each of said plurality of chain members, said idler wheel being biased in a direction toward said conveyor.

12. The improved loin puller of claim 9 further comprising a secondary conveyor for supporting and conveying a front quarter portion of said carcass half.

13. The improved loin puller of claim 9 further comprising a stationary support member carried by said frame for supporting a front quarter portion of said carcass half.

14. An improved loin puller for pulling a selected carcass half and separating the loin thereof from the back fat, said improved loin puller comprising:
- a frame for elevating a working surface a selected distance above a support surface;
- a conveyor carried by said frame for conveying said carcass half toward a selected location;
- a cutting blade carried by said frame proximate said selected location, said cutting blade being disposed a selected distance above said conveyor to define a depth of cut, said cutting blade defining a selected cutting contour for separating said loin from said back fat;
- a cutting depth adjustor carried by said frame and independently operable by an operator of said loin puller for selectively increasing and decreasing said depth of cut;
- a cutting width adjustor carried by said cutting width adjustor, and independently operable by said operator of said loin puller, for selectively narrowing and widening said cutting contour of said cutting blade during said separating of said loin from said back fat, said cutting width adjustor substantially unaltering said depth of cut during adjustment of said cutting width;
- a cutting blade heater carried by said cutting blade for heating said cutting blade during operation of said improved loin puller; and
- a loin gripper carried by said frame for gripping said loin and forcing said loin and back fat in a direction toward said conveyor, said loin gripper including a plurality of chain members, each of said chain members engaged with at least two sprocket members, and a biasing member for biasing each of said plurality of chain members in a direction toward said conveyor, each of said plurality of chain members being comprised of a plurality of link members defining an endless loop configuration, said link members defining extended portions for engaging said loin, said sprocket members being positioned to maintain each of said plurality of chain members in said endless loop, said sprocket members being rotated by a motor, thereby engaging each of said plurality of chain members including at least one idler wheel disposed within said loop defined by each of said plurality of chain members, said idler wheel being biased in a direction toward said conveyor.

15. The improved loin puller of claim 14 further comprising a secondary conveyor for supporting and conveying a front quarter portion of said carcass half.

16. The improved loin puller of claim 14 further comprising a stationary support member carried by said frame for supporting a front quarter portion of said carcass half.

17. The improved loin puller of claim 14 wherein said cutting blade elevation adjustor comprises:
- a yoke mounted from slide members on said frame;
- a piston rod attached to said yoke;
- a fluid-operated cylinder for axial movement of said piston rod; and
- a pump for injecting and evacuating fluid relative to said cylinder.

18. The improved loin puller of claim 17 wherein one end of said cutting blade is attached to one leg of said yoke, and wherein said cutting width adjustor comprises:
- a blade mount for receiving a second end of said cutting blade;
- parallel arms having one end of each pivotally attached to said blade mount and second ends of each pivotally attached to a second leg of said yoke;
- a further piston rod attached to said blade mount;
- a further fluid-operated cylinder for axial movement of said further piston rod; and
- a further pump for injecting and evacuating fluid relative to said further cylinder.

19. The improve loin puller of claim 18 wherein said conveyor and said loin gripper are driven by a common motor at a selected speed, said improved loin puller further comprising are remote control unit for operation by said operator of said loin puller, said remote control unit containing at least a switch for energizing and de-energizing said drive motor, a switch for controlling operation of said pump, and a further switch for controlling operation of said further pump, during operation of said loin puller by said operator.

* * * * *